INVENTORS.
STANLEY EUGENE DEVOE
MARTIN PAUL KUNSTMANN

BY

*Norton S. Johnson*
ATTORNEY

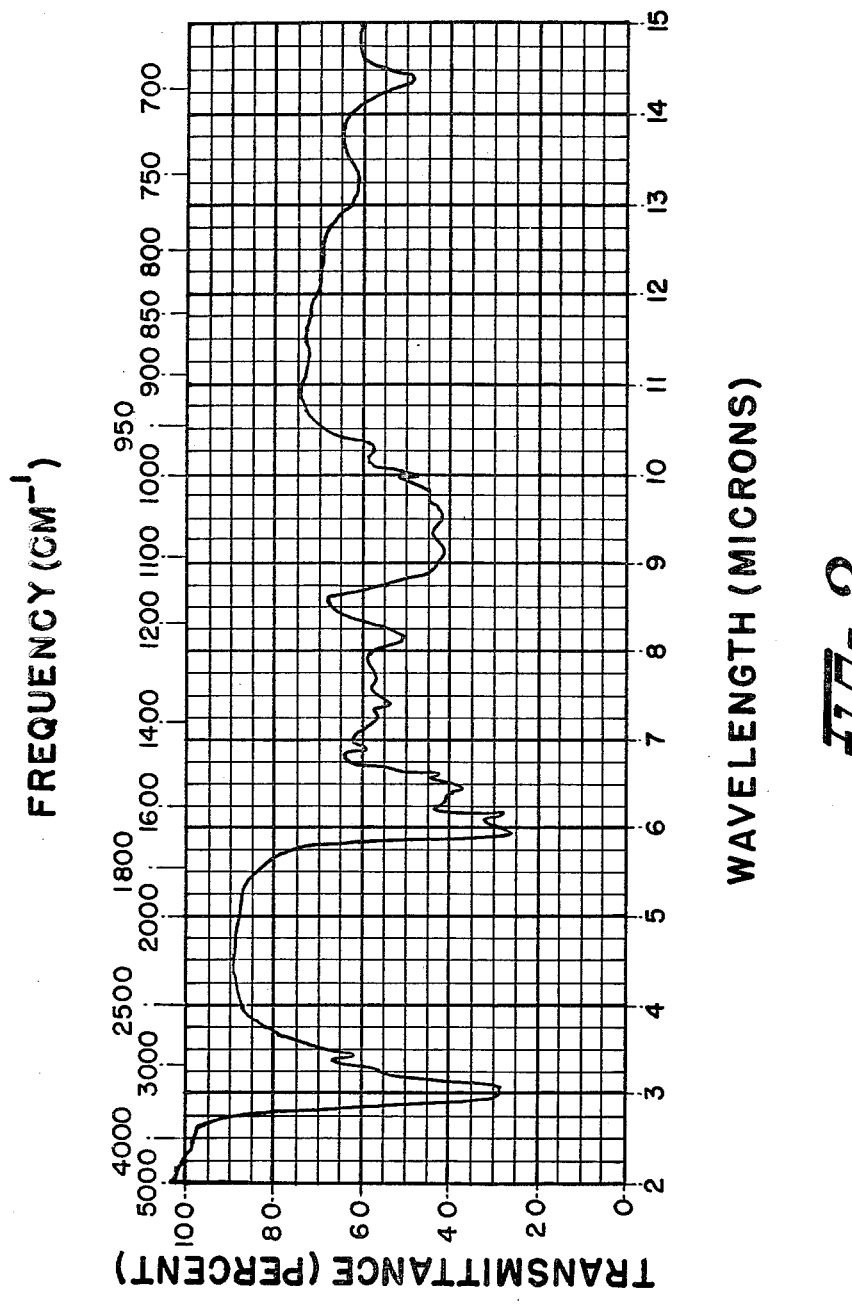

United States Patent Office 3,495,004
Patented Feb. 10, 1970

3,495,004
ANTIBIOTIC AC–98 AND PRODUCTION THEREOF
Stanley Eugene De Voe, Blauvelt, and Martin Paul Kunstmann, Pearl River, N.Y., assignors to American Cyanamid Company, Stamford, Conn., a corporation of Maine
Continuation-in-part of application Ser. No. 591,225, Nov. 1, 1966. This application Aug. 13, 1968, Ser. No. 768,571
Int. Cl. A61k 21/00
U.S. Cl. 424—117                               4 Claims

ABSTRACT OF THE DISCLOSURE

A new antibiotic is produced, designated AC–98 by cultivating under controlled conditions a new strain of *Streptomyces hygroscopicus* NRRL 3085. The new antibiotic is active against a variety of microorganisms, especially gram-positive bacteria. The physical, chemical and biological properties of the new antibiotic are described hereinafter.

---

Figure 1:
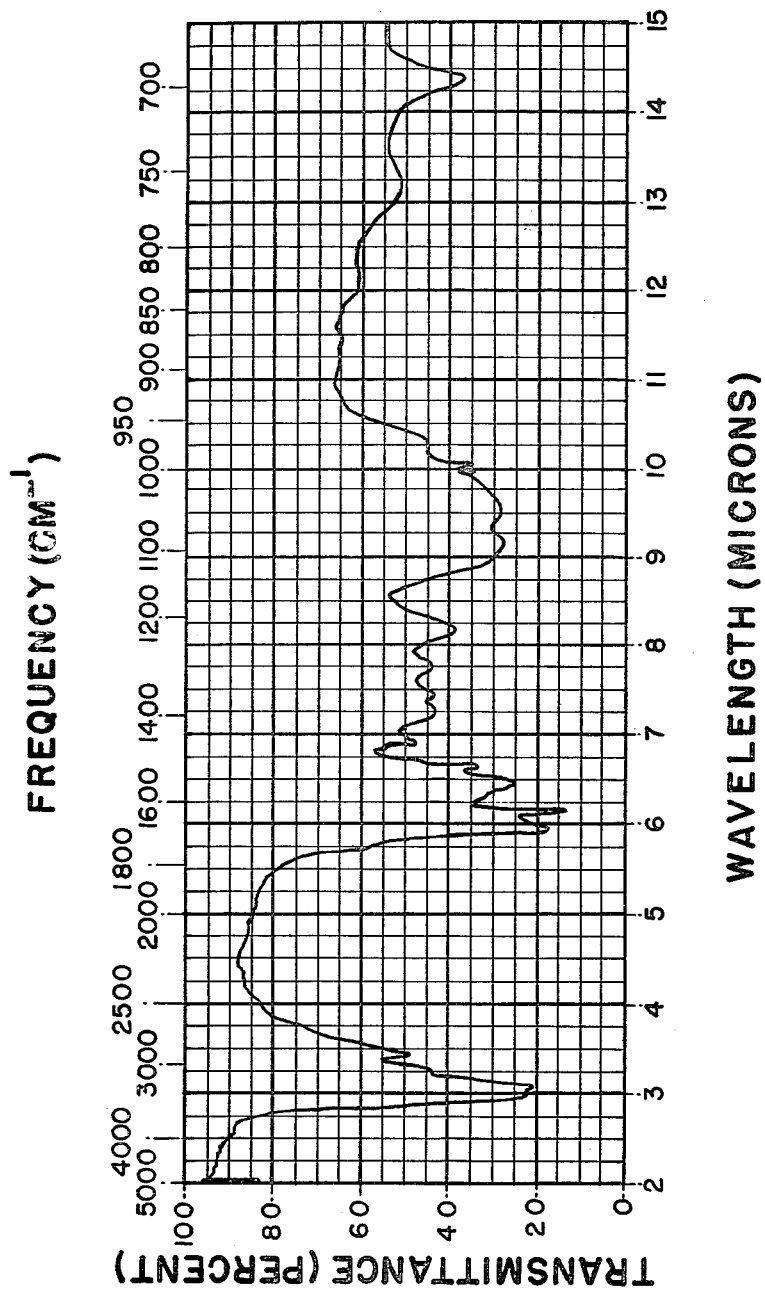

This application is a continuation-in-part of our co-pending application Ser. No. 591,225, filed Nov. 1, 1966, now abandoned which, in turn, is a continuation-in-part of application Ser. No. 357,823, filed Apr. 6, 1964, now abandoned.

This invention relates to a new antibiotic, to its production by fermentation, to methods for its recovery and concentration from crude solutions, to processes for its purification, and to methods for the preparation of its salts.

The present invention includes within its scope the antibiotic in dilute forms, as crude concentrates and in pure crystalline forms. These novel products are active against a variety of microorganisms including gram-positive bacteria. The effects of the new antibiotic on specific microorganisms, together with its chemical and physical properties, differentiate it from previously described antibiotics.

The new antibiotic which we have designated AC–98 is formed during the cultivation under controlled conditions of a new strain of a species known as *Streptomyces hygroscopicus*.

A viable culture of the new strain of *Streptomyces hygroscopicus* has been deposited with the Culture Collection Laboratory, Northern Utilization Research and Development Division, United States Department of Agriculture, Peoria, Ill., and has been added to its permanent collection. It is freely available in this repository under its Accession No. NRRL 3085.

The following is a general description of the organism based on the diagnostic characteristics observed. The underscored descriptive colors and code color chip designations are taken from "Color Harmony Manual" 3rd ed. (1948).

*Amount of growth.*—Moderate to good on most media; light on Czapek's solution and inorganic salts-starch agars.

*Aerial mycelium and/or en masse spore color.*—Aerial mycelium whitish, becoming Silver Gray (3 fe) to Covert Gray (2 fe) to Beige (3 ge).

*Soluble pigment.*—Soluble pigment absent on most media; yellowish and in light amounts on Carvajal's oatmeal agar.

*Reverse color.*—In yellowish to brownish shades.

*Miscellaneous physiological reactions.*—Nitrates reduced to nitrites in synthetic nitrate broth; good gelatin liquefaction; no chromogenicity on peptone-iron agar. Carbon source utilization according to the Pridham et al. method [J. Bact. 56:107–114, (1948)] as follows: Good to fair utilization of d-fructose, i-inositol, lactose, d-mannitol, d-melibiose, d-trehalose, d-xylose, l-arabinose, d-raffinose and dextrose; poor to non-utilization of adonitol, salicin, dextran, d-melezitose, l-rhamnose and sucrose.

*Morphology.*—Aerial mycelium gives rise to tightly spiralled and coiled spore chains. Spores mostly elliptical, $0.6\mu \times 1.0-1.2\mu$. Spore surfaces smooth as determined by electron microscopy.

When following Pridham et al. ["A Guide for the Classification of Streptomycetes According to Selected Groups" Appl. Microbiol. 6:52–79 (1958)], the combination of tightly coiled and spiralled spore chains with gray-brown en masse spore color places the new soil isolate in the "Grey" series of the reaction "Spira." Of the species contained within this series, the new culture most closely corresponds with the concept of *Streptomyces hygroscopicus*. Comparison of this culture with several reference strains of *S. hygroscopicus* confirmed the identification henceforth, this new culture will be considered a representative strain of *Streptomyces hygroscopicus*.

The cultural, morphological and physiological characteristics of the new strain of *Streptomyces hygroscopicus* when grown on several media including those recommended by Pridham et al. ["A Selection of Media for Maintenance and Taxonomic Study of Streptomyces," Antibiotics Annual (1956–1957), pages 947–953] are set forth in Tables I, II, III and IV. The underscored descriptive colors are taken from "Color Harmony Manual."

TABLE I.—CULTURAL CHARACTERISTICS OF *STREPTOMYCES HYGROSCOPICUS* NRRL 3085

[Incubation: 14 days; temperature: 28° C.]

| Medium | Amount of Growth | Aerial Mycelium and/or Spores | Soluble Pigment | Reverse Color | Remarks |
|---|---|---|---|---|---|
| Czapek's Solution agar | Light | Aerial mycelium colorless, becoming Silver Gray (3 fe) in sporulating zones. Sporulation very light. | None | Light brownish | |
| Asparagine Dextrose agar | Moderate | Aerial mycelium whitish, becoming Covert Gray (2 fe) in sporulating areas. Sporulation light. | do | Cream (1½ ca) | |
| Tomato Paste agar | do | Aerial mycelium whitish, becoming Silver Gray (3 fe) in sporulating zones. Sporulation moderate. | do | Bamboo (2 fb) | Lightly hygroscopic. |
| Hickey and Tresner's agar. | do | Aerial mycelium whitish, becoming Silver Gray (3 fe) in sporulating ones. Sporulation light. | do | Dusty Coral (6 gc) | Do. |
| Yeast Extract agar | Good | Aerial mycelium whitish, becoming Beige (3 ge) in sporulating zones. Sporulation heavy. | do | Covert Brown (2 nl) | Conspicuously hygroscopic. |
| Oatflake agar | do | Aerial mycelium whitish, becoming Silver Gray (3 fe) in sporulating zones. Sporulation good. | do | Mustard (2 le) | Hygroscopic areas. |
| Carvajal's Oatmeal agar | do | do | Yellowish; light | Cinnamon (3 le) | Do. |
| Tomato Paste Oatmeal | do | Aerial mycelium whitish, becoming Silver Gray (3 fe) in sporulating areas. Sporulation heavy. | None | Oak Brown (3 pi) | |

TABLE I—Continued

| Medium | Amount of Growth | Aerirl Mycelium and/or Spores | Soluble Pigment | Reverse Color | Remarks |
|---|---|---|---|---|---|
| Potato Dextrose agar | Moderate | Aerial mycelium whitish, becoming Covert Gray (2 fe) in sporulating areas. Sporulation moderate. | do | Bamboo (2 fb) | |
| Bennett's agar | do | Aerial mycelium whitish, becoming Silver Gray (3 fe) in sporulating areas. Sporulation moderate. | do | Covert Brown (2 nl) | Lightly hygroscopic. |
| Inorganic Salts-Starch agar. | Light | Aerial mycelium whitish, scanty. Trace of grayish sporulation. | do | Cream (1½ ca) | |

TABLE II.—MICROMORPHOLOGY OF *STREPTOMYCES HYGROSCOPICUS* NRRL 3085

| Medium | Aerial Mycelium and/or Sporiferous Structures | Spore Shape | Spore Size | Spore Surface |
|---|---|---|---|---|
| Bennett's agar | Aerial mycelium giving rise to spore chains in the form of tightly wound spirals or coils. | Spores mostly elliptical | $0.6\mu \times 1.0-1.2\mu$ | Spore surface smooth as determined by electron microscopy. |

TABLE III.—MISCELLANEOUS PHYSIOLOGICAL REACTIONS OF *S. HYGROSCOPICUS* NRRL 3085

Temperature: 28° C.

| Medium | Incubation Period | Amount of Growth | Physiological Reaction |
|---|---|---|---|
| Organic Nitrate Broth | 7 Days | Heavy | Nitrates not reduced to nitrates. |
| Do | 14 Days | do | Do. |
| Synthetic Nitrate Broth | 7 Days | Slight | Nitrates reduced to nitrates. |
| Do | 14 Days | Moderate | Do. |
| Gelatin | 7 Days | do | Partial liquefaction. |
| Do | 14 Days | do | Complete liquefaction. |
| Iron-peptone agar | 24 Hours | do | Negative chromogenicity. |

TABLE IV

Carbon source utilization pattern of *S. hygroscopicus* NRRL 3085

Incubation: 10 days; temperature: 28° C.

| Carbon source: | Utilization [1] |
|---|---|
| Adonitol | 1 |
| l-arabinose | 2 |
| Dextran | 0 |
| d-Fructose | 3 |
| i-Inositol | 3 |
| Lactose | 3 |
| d-Mannitol | 3 |
| d-Melezitose | 0 |
| d-Melibiose | 3 |
| d-Raffinose | 2 |
| l-Rhamnose | 0 |
| Salicin | 1 |
| Sucrose | 0 |
| d-Trehalose | 3 |
| d-Xylose | 3 |
| Dextrose | 2 |
| Negative control | 0 |

[1] 3=Good utilization; 2=fair utilization; 1=poor utilization; 0=no utilization.

It is to be understood that for the production of the new antibiotic, the present invention is not limited to this particular organism or to organisms fully answering the above growth and microscopic characteristics which are given for illustrative purposes. In fact, it is desired and intended to include the use of mutants produced from the described organism by various means such as X-radiation, ultraviolet radiation, nitrogen mustard, phage exposure and the like.

THE FERMENTATION PROCESS

The cultivation of the new strain of *S. hygroscopicus* NRRL 3085 may take place in a variety of liquid culture media. Media which are useful for the production of the novel antibiotic include an assimilable source of carbon such as starch, sugar, molasses, glycerol, etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc., are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil may be added as needed.

SHAKER FLASK FERMENTATION

For shaker flask fermentations, 100-milliliter sterile portions of the following liquid inoculum in 500-milliliter flasks are inoculated with an agar slant of the culture.

| Liquid inoculum: | Grams per liter |
|---|---|
| Bactopeptone | 5 |
| Glucose | 10 |
| Molasses | 20 |

The flasks are incubated at about 28° C. on a reciprocating shaker and agitated vigorously for 24 to 72 hours, usually for 48 hours.

TANK FERMENTATION

For the production of the antibiotic in tank fermenters the following medium is preferably used.

| Fermentation medium: | Grams per liter |
|---|---|
| Bactopeptone | 5 |
| Glucose | 10 |
| Molasses | 20 |
| Calcium carbonate | 1 |

Each tank is inoculated with from 0.1 to 10% inclusive, of a culture broth fermented as described above for shaker flask fermentation. Aeration is supplied at the rate of 0.2–2.0 volumes, inclusive, of sterile air per volume of broth per minute and the broth is agitated by an impeller driven at about 300–800 r.p.m. The temperature is maintained at 20–35° C., usually at 28° C. The fermentation may be continued for from 24–240 hours, at which time the mash is harvested.

ISOLATION PROCEDURE

After the fermentation is completed, the fermented mash containing the antibiotic of this invention is filtered, preferably at pH 7.8 to remove the mycelium. Diatomaceous earth or any other conventional filtration aid may be used to assist the filtration. Ordinarily, the mycelial cake is washed with water and the wash is pooled with the filtrate. Thereafter, the antibiotic may be recovered from the combined filtrate and wash using conventional techniques, as, for example, by adsorption on activated carbon at about pH 9, filtering with the aid of diatomaceous earth and elution with acidic 75% acetone. The antibiotic-containing eluate is concentrated and further purified by passing through a silica gel column and subsequently through a weakly acidic cation exchange resin. The antibiotic which is retained on the resin is eluted and the eluate is concentrated and precipitated to yield the semi-purified antibiotic mixture.

PURIFICATION PROCEDURE

Further purification of the antibiotic activity and its separation into two components termed complexes A and B may be effected by displacement chromatography on CM Sephadex cation exchanger. In this method, the semi-purified antibiotic is charged onto a column packed with CM Sephadex equilibrated with 1% ammonium formate. The charged column is then developed with a gradient between 1% ammonium formate and 2.6% ammonium formate. The eluate is monitored for the antibiotic activity using ultraviolet absorption at 256 m$\mu$ and appropriate fractions containing complex A are collected separately from fractions containing complex B. Both of the complexes may be recovered by repeated lyophilization of the respective eluates.

The novel antibiotic of this invention contains the elements carbon, hydrogen, oxygen, nitrogen, chlorine and sulfur in substantially the following percentages by weight:

|            | Complex A Base | Complex B Base |
|------------|----------------|----------------|
| Carbon     | 48.62          | 46.27          |
| Hydrogen   | 6.55           | 6.15           |
| Oxygen     | 32.56          | 30.85          |
| Nitrogen   | 10.92          | 11.68          |
| Chlorine   | 1.15           | 1.08           |
| Sulfur     | 0.87           | 0.92           |

The following are various physical characteristics of AC–98 antibiotic complex A base:

The percent of methyl groups attached to nitrogen is 0.51.

The optical rotation is $[\alpha]_D^{25} = -4.05°$ ($\pm 3°$)

(C=0.991 in water)

Ultraviolet maxima occur at the following wavelengths in neutral solutions and are essentially unchanged in acidic or basic solutions:

| $\lambda_{max.}$ (m$\mu$): | $E_{1\,cm.}^{1\%}$ |
|---|---|
| 278 | 4.4 |
| 272 | 5.5 |
| 267 | 5.3 |
| 264 | 5.2 |
| 258 | 4.4 |
| 252 | 3.3 |
| 220 (inflexion) | 115 |

An infrared absorption spectrum of the AC–98 antibiotic complex A base in a KBr pellet, prepared in a standard manner, exhibits characteristic absorption at the following wavelengths expressed in microns: 3.0, 3.08, 3.26, 3.44, 5.80, 5.89, 5.95, 6.13, 6.43, 6.48, 6.64, 6.70, 6.85, 6.91, 6.97, 7.28, 7.46, 7.75, 8.20, 8.95, 9.13, 9.50, 10.25, 12.10, 13.18, 14.40. The infrared curve is shown in FIGURE 1 of the accompanying drawings.

The following are various physical characteristics of AC–98 antibiotic complex B base:

The percent of methyl groups attached to nitrogen is 0.23.

The optical rotation is $[\alpha]_D^{25} = -5.65°$ ($\pm 2.8°$)

(C=1.063 in water)

Ultraviolet maxima occur at the following wavelengths in neutral solutions and are essentially unchanged in acidic or basic solutions:

| $\lambda_{max.}$ (m$\mu$): | $E_{1\,cm.}^{1\%}$ |
|---|---|
| 278 | 4.8 |
| 272 | 6.0 |
| 268 | 5.9 |
| 264 | 5.9 |
| 258 | 5.0 |
| 252 | 4.0 |
| 220 (inflexion) | 130 |

An infrared absorption spectrum of the antibiotic complex base in a KBr pellet, prepared in a standard manner, exhibits characteristic absorption at the following wavelengths expressed in microns: 3.0, 3.06, 3.26, 3.44, 5.96, 6.13, 6.32, 6.42, 6.47, 6.63, 6.70, 6.90, 7.27, 7.45, 7.73, 8.20, 8.95, 9.15, 9.47, 9.80, 10.28, 13.23, 14.40. The infrared curve is shown in FIGURE 2 of the accompanying drawings.

AC–98 antibiotic mixture shows three main zones of inhibition against both *Bacillus subtilis* and *Corynebacterium xerosis*, centered at R$_f$ values of 0.01–0.15, 0.15–0.45, and 0.45–0.70 when chromatographed on whatman No. 1 paper strips using 5% aqueous ammonium chloride for development. AC–98 antibiotic complex A chromatographed in a similar manner shows three zones of inhibition with R$_f$ values of 0.04, 0.23, 0.57 while AC–98 antibiotic complex B shows three zones of inhibition with R$_f$ values of 0.03, 0.18, 0.63.

The novel antibiotic of this invention is clearly distinguished from other antibiotics by the characterization data given above and by its antimicrobial activity.

The in vitro antimicrobial activity of AC–98 antibiotic mixture, AC–98 antibiotic complex A, and AC–98 antibiotic complex B is presented in the table below which shows the minimal inhibitory concentrations required to inhibit the growth of representative microorganisms in a nutrient medium.

TABLE V

|  | Minimal Inhibitory Concentrations (micrograms/ml.) | | |
|---|---|---|---|
|  | AC98 Antibiotic Mixture | AC98 Antibiotic Complex A | AC98 Antibiotic Complex B |
| *Staphylococcus aureus* ATCC 6538P | 31 | 31 | 62 |
| *Staphylococcus aureus* No. 69 | 12.5 | 12.5 | 31 |
| *Staphylococcus aureus*, Rose ATCC 14154 | 12.5 | 31 | 31 |
| *Staphylococcus aureus*, Smith, ATCC 13709 | 12.5 | 12.5 | 31 |
| *Staphylococcus aureus* N. Y. 104 | 31 | 31 | 31 |
| *Streptococcus faecalis* ATCC 8043 | 62 | 125 | 125 |
| *Streptococcus pyogenes* C 203 | 12.5 | 12.5 | 31 |
| *Streptococcus sp.*, nonhemolytic No. 11 | 62 | 125 | 125 |
| *Streptococcus sp.*, β hemolytic No. 80 | 62 | 125 | 125 |
| *Sarcina lutea* ATCC 9341 | 6.2 | 6.2 | 12.5 |
| *Bacillus subtilis* ATCC 6633 | 6.2 | 12.5 | 31 |
| *Proteus vulgaris* ATCC 9484 | >125 | >125 | >125 |
| *Escherich a col* ATCC 9637 | >125 | >125 | >125 |
| *Mycobacterium smegmatis* ATCC 607 | 12.5 | 12.5 | 31 |
| *Bacillus cereus* ATCC 10702 | 31 | 31 | 62 |
| *Salmonella gallinarum* Led. An. Ind. 604 | >125 | >125 | >125 |
| *Pseudomonas aeruginosa* ATCC 10145 | >125 | >125 | >125 |
| *Clostridium sporogenes* ATCC 7955 | >4 |  |  |

The novel antibiotic of this invention is active against gram-positive microorganisms, such as staphylococci, pneumococci, and streptococci.

The usefulness of the novel antibiotic is demonstrated by its ability to control systemic lethal infections in mice. The new antibiotic of this invention shows in vivo antibacterial activity in mice against *Staphylococcus aureus*, strain Smith, *Staphylococcus aureus*, strain Rose, and *Streptococcus pyogenes*, C–203, when administered by a single dose to groups of Carworth Farms CF$_1$ male mice, weight 18–22 grams, infected intraperitoneally with a lethal dose of these bacteria in $10^{-2}$, $10^{-0}$ and $10^{-5}$ trypticase soy broth (TSP) dilutions, respectively, of a five hour, TSP broth culture.

Table VI below illustrates the in vivo antibacterial activity of the antibiotic.

TABLE VI.—IN VIVO ANTIBACTERIAL ACTIVITY OF AC-98 ANTIBIOTIC MIXTURE, AC-98 ANTIBIOTIC COMPLEX A, AND AC-98 ANTIBIOTIC COMPLEX B

| Test System | Dosage (mg./kg. of body wt.) Single subcutaneous dose | Survivors/Total (SSC) | | |
|---|---|---|---|---|
| | | AC-98 Antibiotic Mixture | AC-98 Antibiotic Complex A | AC-98 Antibiotic Complex B |
| Staphylococcus aureus Smith Strain ($10^{-1}$). | 40 | 28/30 | 9/10 | 10/10 |
| | 20 | 26/30 | 10/10 | 10/10 |
| | 10 | 20/30 | 10/10 | 7/10 |
| | 5 | 1/30 | 2/10 | 3/10 |
| | 2.5 | 1/30 | 1/10 | 1/10 |
| Staphylococcus aureus Rose Strain ($10^0$). | 80 | 10/10 | | |
| | 40 | 16/20 | | |
| | 20 | 8/20 | | |
| | 10 | 1/20 | | |
| | 5 | 0/20 | | |
| Streptococcus pyogenes C-203 ($10^{-5}$). | 80 | 20/20 | | |
| | 40 | 15/20 | | |
| | 20 | 2/20 | | |
| | 10 | 0/20 | | |
| | 5 | 0/10 | | |
| Escherichia coli 311 ($10^{-3}$). | 160 | 8/20 | | |
| | 80 | 5/20 | | |
| | 40 | 0/20 | | |
| Diplococcus pneumoniae SVI ($10^{-6}$). | 80 | 20/20 | | |
| | 40 | 20/20 | | |
| | 20 | 7/20 | | |
| | 10 | 1/20 | | |
| | 5 | 0/10 | | |
| Pasteurella multocida 310 ($10^{-6}$). | 160 | 13/20 | | |
| | 80 | 4/20 | | |
| | 40 | 0/20 | | |

The invention will be described in greater detail in conjunction with the following specific examples.

EXAMPLE 1

Inoculum preparation

A typical medium used to grow the primary inoculum is prepared according to the following formula:

| | Grams |
|---|---|
| Bactopeptone | 5 |
| Glucose | 10 |
| Molasses | 20 |
| Water to 1000 milliliters. | |

A yeast-malt agar slant of a culture of the species S. hygroscopicus NRRL 3085 is incubated for a week. At this time the spores and mycelium are transferred to two 500-milliliter flasks which contain 100 milliliters of the above sterile medium. The flasks are placed on a reciprocating shaker and agitated vigorously for 48 hours at 28° C. At the end of this time, the flask inocula are used to seed a 5-gallon glass fermenter containing 12 liters of medium.

EXAMPLE 2

Fermentation

A fermentation medium is prepared according to the following formula:

| | Grams |
|---|---|
| Bactopeptone | 5 |
| Glucose | 10 |
| Molasses | 20 |
| Calcium Carbonate | 1 |
| Water to 1000 milliliters. | |

Twelve liters of the above medium is placed in a 5-gallon glass fermenter and is sterilized in an autoclave with steam pressure at 120° C. for 30 minutes. The pH of the medium is about pH 7.0 before sterilization and after sterilization is about pH 7.1. The medium is then inoculated with 200 milliliters of a 2-day inoculum described in Example 1. The fermentation is agitated by an impeller operating at 400 revolutions per minute, and aerated at a rate of 0.0325 c.f.m. The temperature during the course of the fermentation was between 26° C. and 28° C. The fermentation was harvested at approximately 96 hours after inoculation.

EXAMPLE 3

Isolation and purification

Two hundred seventy-five liters of fermented mash as prepared in Example 2, is filtered with the aid of Hyflo (2% w./v.). The mycelial pad is washed with about 30 l. of water (10% v./v.) and then discarded. The pooled filtrate and water wash is adjusted to pH 9.0 with sodium hydroxide and is then stirred for 30 minutes with 375 g. of Darco G-60 (0.125% w./v.). Hyflo (0.06% w./v.) is added and the mixture is filtered. The Darco pad is washed with about 10 l. of water (3% v./v.) and the wash and filtrate are both discarded. The Darco pad is stirred for 10 minutes with 7.5 l. of 75% aqueous methanol (20 ml./g. Darco), after which time the liquid is removed by filtration and discarded. The Darco pad is then stirred for 25 minutes with 15 l. of 75% aqueous acetone (40 ml./g. Darco) containing 36 ml. of concentrated HCl. This suspension is filtered and the Darco pad is washed with an additional 5.1 of 75% aqueous acetone. The pooled filtrate and wash liquid is concentrated to about 5 l. The concentrates from two such fermentations are combined and poured onto a column packed with 500 g. of previously deactivated silica gel. The silica gel (500 g.) is deactivated by slurrying with 2.5 l. of 10% aqueous pyridine. This mixture is poured into a column and washed with about 4 l. of water prior to use. The column is then eluted with an additional 20 l. of water. The eluate from this column, which contains the antibiotic activity, is passed through another column packed with 200 g. of IRC-50 resin ($Na^+$ form). The antibiotic activity, retained on this resin is subsequently eluted with 20 l. of 0.1 N HCl. The acidic eluate is neutralized with sodium bicarbonate and stirred for 45 minutes with 100 g. Darco G-60 (0.5% w./v.) Hyflo (0.5% w./v.) is added and the mixture is filtered. The Darco pad is washed with 0.5 l. each of water and methanol (5 ml./g. Darco) and the wash and filtrate are both discarded. The Darco pad is stirred for 30 minutes with 2.1 (20 ml./g. Darco) of 75% aqueous acetone containing 4.8 ml. of concentrated HCl (2.4 ml./l.). This suspension is filtered and the Darco pad is washed with an additional 0.5 l. of 75% aqueous acetone. The pooled filtrate and wash liquid is concentrated under reduced pressure to an aqueous phase which is further concentrated in the presence of n-butanol to a small volume of the n-butanol phase. Acetone is added and the mixture is centrifuged. The precipitate is washed with a small portion of methanol and acetone and dried in vacuo to give 6.13 g. of purified AC-98 antibiotic mixture. A microanalytical sample of AC-98 antibiotic mixture is prepared by dissolving it in water, concentrating the solution in the presence of n-butanol to a n-butanol phase, filtering, washing the precipitate with acetone and drying it in vacuo ($10^{-3}$ mm.) at 100° C. for 2 days. AC-98 autibiotic mixture, when prepared in the manner indicated above, contains the indicated elements in substantially the following percentages by weight:

| | |
|---|---|
| Carbon | 45.08 |
| Hydrogen | 6.85 |
| Oxygen (diff.) | 31.49 |
| Nitrogen | 10.96 |
| Chlorine | 5.62 |
| Sulfur | trace |

The optical rotation is $[\alpha]_D^{25}=0°$ ($\pm 2.93°$) (C=1.026 in water).

Ultraviolet maxima:

| $\lambda_{max.}$ (m$\mu$): | $E_{1cm}^{1\%}$ |
|---|---|
| 278 | 5.0 |
| 272 | 6.1 |
| 268 | 5.7 |
| 264 | 5.5 |

$\lambda_{max.}$ (m$\mu$): $E_{1cm.}^{1\%}$

| | |
|---|---|
| 258 | 4.4 |
| 253 | 3.4 |
| 220 (inflexion) | 112 |

An infrared absorption spectrum of the antibiotic mixture in a KBr pellet, prepared in a standard manner, exhibits characteristic absorption at the following wavelengths expressed in microns: 3.0, 3.1, 3.26, 3.44, 5.80, 5.92, 5.97, 6.13, 6.49, 6.62, 6.90, 7.23, 7.72, 8.15, 8.97, 9.10, 9.50, 10.25, 13.05, 14.36.

EXAMPLE 4

Resolution of AC–98 antibiotic mixture into antibiotic complexes A and B

CM Sephadex (45 g.) is slurried in 1% aqueous ammonium formate and, after swelling ceases, is poured into a glass column (2.5 cm.×50 cm.). The column is washed with an additional 1 l. of 1% aqueous ammonium formate and then 750 mg. of AC–98 antibiotic mixture, dissolved in 15 ml. of the formate solution, is applied to the column. The column is eluted with a gradient between 4 l. of 1% aqueous ammonium formate and 4 l. of 2.6% aqueous ammonium formate. The antibiotic material in the eluate is monitored using ultraviolet absorption at 265 m$\mu$. Using this procedure AC–98 antibiotic mixture is reproducibly resolved into two major bands of bioactive material, complex A and complex B, along with a third minor band. The portions of the eluate containing AC–98 antibiotic complexes A and B are each lyophylized and the respective lyophylized residues are triturated with methanol and then dried at 58° C. under reduced pressure. Based on several such procedures, an average of 289 mg. of antibiotic complex A and 126 mg. of antibiotic complex B are obtained.

EXAMPLE 5

Preparation of microanalytical sample of AC–98 antibiotic complex A base

A microanalytical sample of AC–98 antibiotic complex A base is prepared by rechromatography on CM sephadex. Accordingly a 700 mg. portion of AC–98 antibiotic complex A is dissolved in 25 ml. of 1.3% aqueous ammonium formate and applied to 45 g. CM sephadex packed in 1.3% aqueous ammonium formate. The column is eluted with a gradient between 4 l. each of 1.3% and 1.9% aqueous ammoniun formate. The antibiotic material in the eluate is monitored using ultraviolet absorption at 265 m$\mu$. AC–98 antibiotic complex A is eluted as a homogeneous band. The eluate containing complex A is lyophylized, and the lyophilized residue triturated with methanol and acetone and then dried at 58° C. under reduced pressure to give 586 mg. of AC–98 antibiotic complex A. A sample (171 mg.) of AC–98 antibiotic complex A obtained as described above is dissolved in 10 ml. of water. The pH of this solution, 4.9, is adjusted to 9.2 with IR45 (OH$^-$) resin. This mixture is filtered and the filtrate is concentrated under reduced pressure in the presence of n-butanol to a n-butanol phase. The residual n-butanol is filtered, the precipitate is washed with acetone, and dried in vacuo (10$^{-3}$ mm.) at 100° C. for 1 day to give 161 mg. of AC–98 antibiotic complex A base. The chemical analysis of this product and its other chemical, physical and biological properties have already been described.

EXAMPLE 6

Preparation of microanalytical sample of AC–98 antibiotic complex B base

A microanalytical sample of AC–98 antibiotic complex B base is prepared by rechromatography on CM sephadex. Accordingly, a 500 mg. sample of AC–98 antibiotic complex B is dissolved in 15 ml. of 1.6% aqueous ammonium formate and applied to 45 g. CM sephadex packed in 1.6% aqueous ammonium formate. The column is eluted with a gradient between 4 l. each of 1.6% and 2.2% aqueous ammonium formate, and the antibiotic material in the eluate is monitored using ultraviolet absorption at 265 m$\mu$. AC–98 antibiotic complex B is eluted as a homogeneous band. The eluate containing complex B is lyophilized, the lyophilized residue is triturated with methanol and acetone and is then dried at 58° C. under reduced pressure to give 383 mg. of AC–98 antibiotic complex B. A sample (182 mg.) of AC–98 antibiotic complex B obtained as described above is dissolved in 10 ml. of water. The pH of this solution, 5.25, is adjusted to 9.2 with IR45 (OH$^-$) resin. This material is filtered and the filtrate is concentrated under reduced pressure in the presence of n-butanol to a n-butanol phase. The residual n-butanol is filtered, the precipitate is washed with acetone, and dried in vacuo (10$^{-3}$ mm.) at 100° C. for 1 day to give 163 mg. of antibiotic complex B base. The chemical analysis of this product and its other chemical, physical and biological properties have already been described.

EXAMPLE 7

Preparation of AC–98 antibiotic complex A sulfate

AC–98 antibiotic complex A base (100 mg.) is dissolved in 1 ml. of water and the pH is adjusted to 3 with dilute sulfuric acid. Ethanol is added, forming a precipitate, and the mixture is filtered. The precipitate is washed with ethanol and acetone and air dried to give 102 mg. of AC–98 antibiotic complex A sulfate. A microanalytical sample is prepared by precipitating the antibiotic sulfate from aqueous ethanol and drying the precipitate in vacuo (10$^{-3}$ mm.) at 100° C. for 1 day. AC–98 antibiotic complex A sulfate, when prepared in the manner described above, contains the indicated elements in substantially the following percentages by weight:

| | |
|---|---|
| Carbon | 45.06 |
| Hydrogen | 6.45 |
| Oxygen | 32.10 |
| Nitrogen | 10.67 |
| Chlorine | 0.32 |
| Sulfur | 2.20 |

The percent of methyl groups attached to nitrogen is 0.45. Ultraviolet maxima occur at the following wavelengths in neutral solutions and are essentially unchanged in acidic or basic solutions:

$\lambda_{max.}$ (m$\mu$) $E_{1cm.}^{1\%}$

| | |
|---|---|
| 278 | 4.1 |
| 272 | 5.2 |
| 267 | 5.0 |
| 264 | 4.8 |
| 258 | 3.9 |
| 252 | 2.9 |
| 220 (inflexion) | 150 |

An infrared absorption spectrum of AC–98 antibiotic complex A sulfate in a KBr pellet, prepared in a standard manner, exhibits characteristic absorption at the following wavelengths expressed in microns: 3.0, 3.09, 3.26, 3.45, 5.80, 5.88, 5.96, 6.15, 6.42, 6.50, 6.64, 6.70, 6.90, 7.22, 7.75, 8.20, 8.95, 9.15, 9.42, 10.01, 10.30, 12.13, 13.20, 14.40.

EXAMPLE 8

Preparation of AC–98 antibiotic complex B sulfate

AC–98 antibiotic complex B base (100 mg.) is dissolved in 1 ml. of water and the pH is adjusted to 3 with dilute sulfuric acid. Ethanol is added, forming a precipitate, and the mixture is filtered. The precipitate is washed with ethanol and acetone and air dried to give 105 mg. of AC–98 antibiotic complex B sulfate. A microanalytical sample is prepared by precipitating the antibiotic sulfate from n-butanol, washing the precipitate with ethanol and acetone, and drying it in vacuo ($10^{-3}$ mm.) at 100° C. for 1 day. AC-98 antibiotic complex B sulfate, when prepared in the manner described above, contains the indicated elements in substantially the following percentages by weight:

| | Percent |
|---|---|
| Carbon | 45.20 |
| Hydrogen | 6.20 |
| Oxygen | 31.17 |
| Nitrogen | 11.27 |
| Chlorine | 0.40 |
| Sulfur | 2.49 |

The percent of methyl groups attached to nitrogen is 0.18. Ultraviolet maxima occur at the following wavelengths in neutral solutions and are essentially unchanged in acidic or basic solutions:

| $\lambda_{max.}$ (m$\mu$) | $E_{1\,cm.}^{1\%}$ |
|---|---|
| 278 | 4.4 |
| 272 | 5.5 |
| 268 | 5.3 |
| 264 | 5.1 |
| 258 | 4.2 |
| 252 | 3.0 |
| 220 (inflexion) | 150 |

An infrared absorption spectrum of AC-98 antibiotic complex B sulfate in a KBr pellet, prepared in a standard manner, exhibits characteristic absorption at the following wavelengths expressed in microns: 3.0, 3.05, 3.27, 3.44, 5.96, 6.10, 6.35, 6.42, 6.54, 6.62, 6.68, 6.89, 7.25, 7.72, 8.15, 8.88, 9.15, 9.43, 9.75, 10.26, 13.32, 14.40.

What is claimed is:

1. A substance antibiotic AC-98 complex A base characterized as follows:

Analysis:

| | Percent |
|---|---|
| Carbon | 48.62 |
| Hydrogen | 6.55 |
| Oxygen | 32.56 |
| Nitrogen | 10.92 |
| Chlorine | 1.15 |
| Sulfur | 0.87 |

Optical rotation: $[\alpha]_D^{25} = -4.05°(\pm 3°)(C=0.991$ in water)

Ultraviolet maxima:

| $\lambda_{max.}$ (m$\mu$): | $E_{1\,cm.}^{1\%}$ |
|---|---|
| 278 | 4.4 |
| 272 | 5.5 |
| 267 | 5.3 |
| 264 | 5.2 |
| 258 | 4.4 |
| 252 | 3.3 |
| 220 (inflexion) | 115 |

Infrared spectrum: As shown in FIGURE 1.

$R_f$ values: 0.04, 0.23, 0.57.

2. A substance antibiotic AC-98 complex B base characterized as follows—

Analysis:

| | Percent |
|---|---|
| Carbon | 46.27 |
| Hydrogen | 6.15 |
| Oxygen | 30.85 |
| Nitrogen | 11.68 |
| Chlorine | 1.08 |
| Sulfur | 0.92 |

Optical rotation: $[\alpha]_D^{25} = 5.65°(\pm 2.8°)(C=1.063$ in water).

Ultraviolet maxima:

| $\lambda_{max.}$ (m$\mu$): | $E_{1\,cm.}^{1\%}$ |
|---|---|
| 278 | 4.8 |
| 272 | 6.0 |
| 268 | 5.9 |
| 264 | 5.9 |
| 258 | 5.0 |
| 252 | 4.0 |
| 220 (inflexion) | 130 |

Infrared spectrum: As shown in FIGURE 2.

$R_f$ values: 0.03, 0.18, 0.63.

3. A compound selected from the group consisting of antibiotic AC-98 complex A base as characterized in claim 1 and antibiotic AC-98 complex B base as characterized in claim 2.

4. A process which comprises cultivating *Streptomyces hygroscopicus* NRRL 3085 in an aqueous nutrient medium containing assimilable sources of carbohydrate, nitrogen and inorganic salts under submerged aerobic conditions for a period of from 24–240 hours and at a temperature of from 20–35° C., until substantial antibiotic activity is imparted to said medium by the production of a compound as characterized in claim 3, and then separating into two components antibiotic AC-98 complex A base and antibiotic AC-98 complex B base by displacement chromatography.

References Cited

Miller: The Pfizer Handbook of Microbial Metabolities, McGraw–Hill Book Co., Inc., New York, N.Y., 1962, p. 580.

ALBERT T. MEYERS, Primary Examiner

J. D. GOLDBERG, Assistant Examiner

U.S. Cl. X.R.

195—80